(12) United States Patent
Bertrand

(10) Patent No.: US 7,756,671 B2
(45) Date of Patent: Jul. 13, 2010

(54) METHOD OF TIMING A REMARKABLE ANGULAR POSITION OF A SENSOR CARRIED BY A TIRE

(75) Inventor: David Bertrand, Besançon (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 156 days.

(21) Appl. No.: 11/985,504

(22) Filed: Nov. 15, 2007

(65) Prior Publication Data

US 2008/0126006 A1    May 29, 2008

(30) Foreign Application Priority Data

Nov. 15, 2006    (FR) .................................. 06 09989

(51) Int. Cl.
*G01C 9/00*    (2006.01)
(52) U.S. Cl. ..................................... 702/157
(58) Field of Classification Search ................. 702/151; 340/425.5

See application file for complete search history.

(56) References Cited

U.S. PATENT DOCUMENTS 6,988,395 B1    1/2006    Bleckmann et al.

2003/0080857 A1 *   5/2003   Hartmann et al. ........ 340/425.5

FOREIGN PATENT DOCUMENTS

| FR | 2 824 904 | 11/2002 |
|----|-----------|---------|
| WO | WO 03/014693 | 2/2003 |

OTHER PUBLICATIONS

French Search Report issued in the corresponding foreign application No. FR 0609989, Aug. 15, 2007.

* cited by examiner

*Primary Examiner*—Tung S Lau
*Assistant Examiner*—Xiuquin Sun
(74) *Attorney, Agent, or Firm*—Cohen Pontani Lieberman & Pavane LLP

(57) ABSTRACT

A method of timing a remarkable angular position ($\theta_R$) of at least one sensor (12) carried by a tire (10) rotating relative to an external frame of reference. The following steps are performed: forming, from an output signal from the sensor (12), a reference signal suitable for presenting a remarkable extremum during one revolution of the tire (10); determining the time of an origin angular position ($\theta_0$) of the sensor as being the time of the remarkable extremum of the reference signal; and determining the time of the remarkable angular position ($\theta_R$) relative to the time of the origin angular position.

10 Claims, 2 Drawing Sheets

METHOD OF TIMING A REMARKABLE ANGULAR POSITION OF A SENSOR CARRIED BY A TIRE

RELATED APPLICATIONS

This application claims the priority of French patent application no. 06/09989 filed Nov. 15, 2006 the entire content of which is hereby incorporated by reference.

FIELD OF THE INVENTION

The present invention relates to a method of timing a remarkable angular position of a sensor carried by a tire.

BACKGROUND OF THE INVENTION

In the state of the art, it is known to fit a tire with a sensor, e.g. a sensor for sensing deformation, displacement, force, acceleration, pressure, stress, . . . , for measuring the behavior of the tire while it is running. The sensor delivers a signal that varies over time as a function of the rotation of the tire.

For example, with a deformation sensor, the time-varying signal delivered is characteristic of the deformation of the tire. By means of this signal, it is possible to evaluate tire deformation at a particular instant.

It is generally more advantageous to know the value of the signal delivered by the sensor when it is at a particular angular position relative to an external frame of reference, rather than at a given instant. As examples of remarkable angular positions, mention can be made of the top of the tire, the center of its contact area, entry into the contact area, or exit from the contact area.

In the state of the art, a method is known that makes it possible to establish a relationship between the time-varying signals as measured by the sensor and the angular position of the sensor at a given instant. That known method consists in providing the tire not only with the sensor, but also with a device for measuring rotation of the tire. By way of example, that device may be carried by the axle of the wheel carrying the tire, as applies to angle encoders known in the state of the art.

Nevertheless, that solution presents the following drawbacks:

the tire rotation measurement device is generally external to the tire, whereas the sensor is carried by the tire. Information relating to the angular rotation of the tire and information measured by the sensor are therefore not located in the same place, which requires the provision of data transfer means;

because the information delivered by the sensor and the information relating to rotation are obtained using two distinct devices, the signals delivered by those two devices are generally not transmitted by the same communication means. The measurements delivered by the sensor carried by the tire are commonly transmitted over a radio link, while the measurements delivered by the tire rotation measurement device carried by the vehicle chassis are transmitted over a wire connection. This often leads to a time offset between the two measured signals, which can degrade measurement accuracy; and finally for reasons of cost, it is generally preferable to make use of an angle encoder already on board the vehicle, for example the encoder used by a device for preventing brake locking. This dependency of the sensor measurement function on some other function of the vehicle can be troublesome.

SUMMARY OF THE INVENTION

One object of the invention is to provide a method of timing a remarkable angular position of at least one sensor carried by a tire that avoids the above-mentioned drawbacks.

This and other objects are attained in accordance with one aspect of the invention directed to a method of timing a remarkable angular position of at least one sensor carried by a tire rotating relative to an external frame of reference, wherein the method comprises:

forming, from an output signal from the sensor, a reference signal suitable for presenting a remarkable extremum during a revolution of the tire;

determining the time of an origin angular position of the sensor as being the time of the remarkable extremum of the reference signal; and determining the time of the remarkable angular position relative to the time of the origin angular position.

By means of the invention, the time of an arbitrary remarkable angular position of the sensor carried by the tire can be determined solely from the measurements provided by that sensor.

There is no need to add a device for measuring rotation of the tire as is necessary in the state of the art.

In order to implement such a method, use is made of the fact that on the sensor passing close to the contact area of the tire, the portion of the tire carrying the sensor is subjected to stress that is remarkable, e.g. to maximum deformation or maximum acceleration. The signal delivered by the sensor then presents an extremum that is remarkable and that makes it possible to time accurately the passage of the sensor through a so-called "origin" angular position. This origin angular position corresponds to the sensor passing through the bottom half of a substantially vertical plane containing the axis of the tire.

In a preferred implementation, at least one pair of right and left sensors is carried by the tire, the sensors of the pair being positioned substantially symmetrically about a midplane of the tire, and the reference signal is formed by applying a predetermined function to each of the output signals from the sensors, and by combining the outputs of the predetermined functions in order to obtain the reference signal.

This implementation is particularly advantageous since it reduces the risk of the remarkable extremum of one of the signals delivered by the sensors being poorly marked or even invisible. Such a situation generally occurs when the tire is subjected to large lateral forces. By using two sensors that are positioned substantially symmetrically about a midplane of the tire, this risk can be obviated since during high levels of side stress, the signal from only one of the two sensors is disturbed. The purpose of the predetermined function is to privilege the signal that is not disturbed over the signal that is disturbed. Thus, the reference signal obtained by combining the outputs from the two predetermined functions is influenced mainly by the signal that is not disturbed, from which it is easy to determine the time of the remarkable extremum.

For example, for the predetermined function, it is possible to use the following function f applied to a signal $s(t)$:

if $s(t) > M$, then $f(s(t)) = M$;

if $s(t) < M$, then $f(s(t)) = M + k \cdot (s(t) - M)$;

where M designates the mean of the signal s(t) during a predefined interval, and k is a positive multiplication coefficient.

A timing method of the invention may also include one or more of the following characteristics:

the output signal of the sensor is characteristic of bending or deradialization of the tire;

the remarkable extremum of the reference signal corresponds to a local maximum in the absolute value of the amplitude of the signal when the signal output by the sensor is characteristic of bending of the tire, or to a local maximum in the absolute value of the derivative of the signal when the signal output by the sensor is characteristic of deradialization of the tire;

in order to time the remarkable extremum of a reference signal, use is made of a tracking signal tracking the reference signal and having two states, and the remarkable extremum of the reference signal is timed at the time the tracking signal changes from one state to the other;

the tracking signal s'(t) tracking the reference signal $s_r(t)$ is a discrete signal having a time step p with two states defined as follows:

$$s'(p)=(1-\lambda)\cdot s'(p-1)+\lambda\cdot(s(p-1)-s'(p));$$

if $s'(p) > s(p)$ then $s'(p)=s(p)$;

where $\lambda$ is a value lying in the range 0 to 1, and the initial value of s' is selected randomly;

the time of the remarkable angular position of the sensor is determined from the time of the origin angular position from an estimated speed of rotation of the tire, and from the angular offset between the remarkable angular position and the origin angular position;

the time of the next passage of the sensor through the remarkable angular position is predicted from a speed of rotation of the tire as estimated during a preceding revolution of the tire and from the time determined for the passage of the sensor through the origin angular position;

the time of the remarkable angular position of the sensor is determined from the time of the origin angular position, from an estimated rotary acceleration of the tire, and from the angular offset between the remarkable angular position and the origin angular position; and at least two sensors are carried by the tire, the angular offset between the sensors in a frame of reference associated with the tire being equal to the angular offset between the remarkable angular position and the origin angular position, with the time at which one of the sensors is in the remarkable angular position being determined by assuming that it is equal to the time at which the other sensor is in the origin angular position.

BRIEF DESCRIPTION OF THE DRAWINGS

The invention can be better understood on reading the following description given purely by way of example and made with reference to the accompanying diagrams, in which.

DETAILED DESCRIPTION OF THE DRAWINGS

Figure 1:
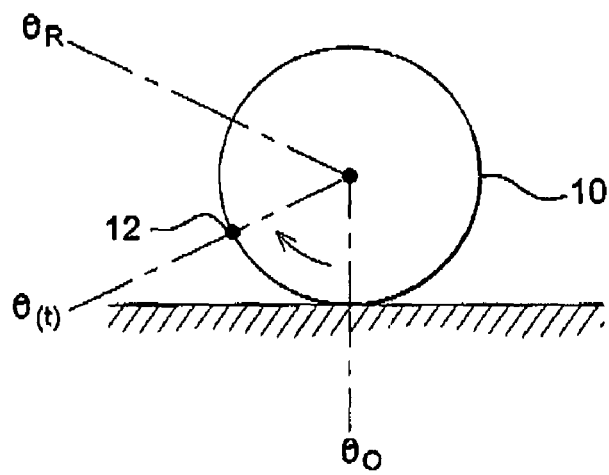
FIG. 1 is a diagram of a tire fitted with a deformation sensor.

FIG. 1 shows a tire 10 provided with a deformation or stress sensor 12 of conventional type positioned in a low inside zone of the tire. Such a sensor is suitable for supplying two types of signal, characteristic respectively of bending and of deradialization of the tire.

The angular position of the sensor 12 over time, relative to an external frame of reference, is written $\theta(t)$.

Figure 2:
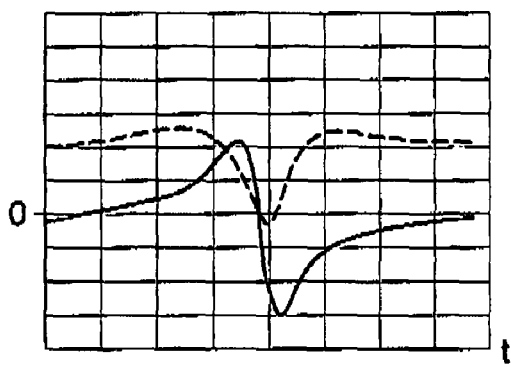
FIG. 2 is a graph showing signals delivered by a deformation sensor carried by a tire running on ground.

While the tire is running on the ground, the angular position $\theta(t)$ of the sensor varies, and the appearance of the signals delivered by the deformation sensor is shown in FIG. 2. The dashed line curve represents the bending signal s(t) delivered by the sensor, while the continuous line curve shows the deradialization signal delivered by the sensor. The values of these two signals vary over time, as the tire runs along the ground and the angular position $\theta(t)$ of the sensor 12 varies relative to an external frame of reference.

During one complete revolution of the tire 10, each of these two signals presents a remarkable extremum that can be seen in FIG. 2. The remarkable extremum of the dashed line bending signal s(t) is a local minimum of its amplitude, while the remarkable extremum visible in the continuous line deradialization signal is a local maximum in the derivative of the signal.

These two remarkable extrema are characteristic of the sensor 12 passing through the center of the area of contact between the tire and the ground. In other words, that corresponds to an angular position of the sensor referred to as its origin angular position $\theta_0$ in which the sensor is situated in the bottom half of a substantially vertical plane contain the axis of the wheel. The time at which the sensor passes through the origin angular position $\theta_0$ is written $t_0$.

As can be seen in FIG. 2, the remarkable extrema of the two signals are substantially simultaneous. Thus, in the description below, consideration is given only to the bending signal delivered by the sensor 12.

The bending signal delivered by the sensor 12 is used to time the origin angular position $\theta_0$ of the sensor 12, from which it is possible to deduce the time of any arbitrary remarkable angular position $\theta_R$. The quality with which the origin angular position of the sensor 12 is timed therefore determines the quality with which the arbitrary remarkable angular position $\theta_R$ is timed.

Figure 3:
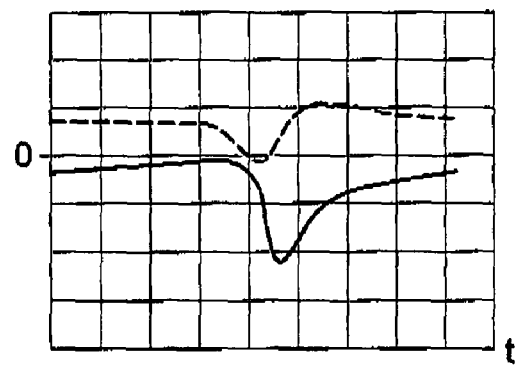
FIG. 3 is a graph identical to that of FIG. 2 under conditions in which the engine is delivering drive to the tire.

While the tire is running under normal conditions on the ground, the signal delivered by the sensor 12 presents a remarkable extremum that is very well marked, as can be seen in FIG. 2. In contrast, when the tire 12 is running on the ground while receiving drive from the engine, or positive or negative lateral thrust, the remarkable extremum of the signal can be much less well marked. The signals delivered by a sensor under these three conditions are shown respectively in FIGS. 3, 4a, and 4b.

Figure 4A:
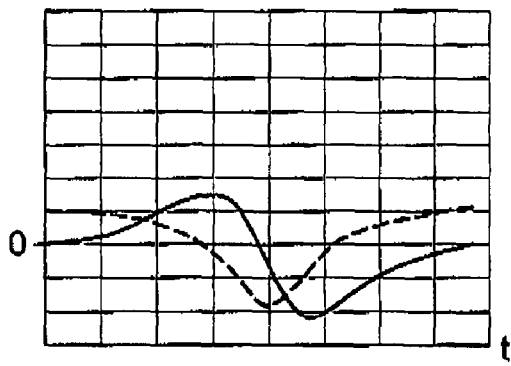
FIGS. 4a and 4b are identical to the graphs of FIGS. 2 and 3 in conditions in which the tire is subjected to positive lateral thrust and to negative lateral thrust.
Figure 4B:
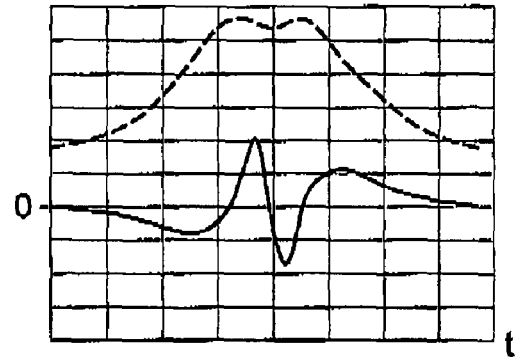

In particular, when the tire is subjected to very strong negative lateral thrust, the signal presents a local minimum that is so poorly marked that it is very difficult to detect and time. This is shown in FIG. 4b. In contrast, when the tire is subjected to very strong positive lateral thrust, the local minimum of the signal is marked appropriately, as can be seen in FIG. 4a.

The method in accordance with an embodiment of the invention mounts two deformation sensors on the tire, one on the right and the other on the left, which sensors are positioned substantially symmetrically about a midplane of the tire, such that when the tire is subjected to strong lateral thrust, at least one of the right and left signals $s_d(t)$ and $s_g(t)$ provided by the two sensors presents a local minimum that is clearly marked. Because of the symmetrical positioning of the two sensors on the tire, both sensors are in an identical angular position, and the local minima in both signals $s_d(t)$ and $s_g(t)$ are simultaneous. It therefore suffices to detect one of the two local minima in order to time the passage of the tire through its origin angular position.

A reference signal $s_r(t)$ is then formed that is under the influence of both signals $s_d(t)$ and $s_g(t)$ output by the two sensors, but that is influenced mainly by the signal presenting a local minimum that is well marked.

To do this, a predetermined function f(s(t)) is applied to each of the signals $s_d(t)$ and $s_g(t)$ output by the sensors, and the outputs from this function are combined by being added together in order to obtain the reference signal $s_r(t)$.

The predetermined function f applied to a signal s(t) is as follows:

if $s(t) > M$, then $f(s(t)) = M$;

if $s(t) < M$, then $f(s(t)) = M + k \cdot (s(t) - M)$;

where M designates the mean of the signal s(t) over a predefined time interval, and k is a positive multiplication coefficient.

Figure 5:
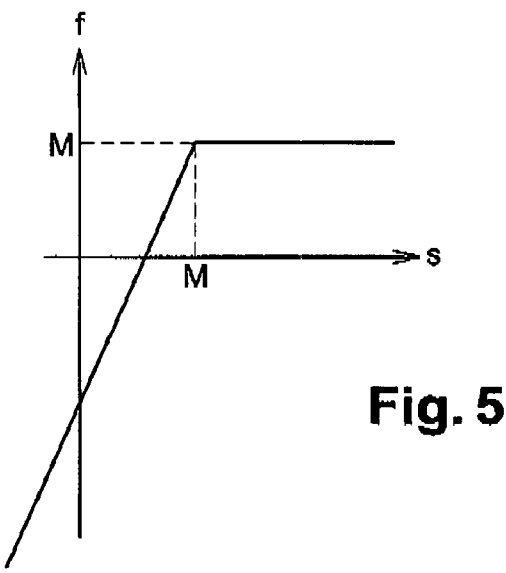
FIG. 5 is a graph showing the predetermined function.

This function is shown diagrammatically in FIG. 5 and it serves to limit the influence of values greater than the mean in the signals $s_d(t)$ and $s_g(t)$, and to increase the influence of values in these signals that are less than the mean.

The reference signal $s_r(t)$ that is obtained by means of this combination always has a predominant contribution from the signal of the sensor for which it is easier to determine a local minimum, such that the reference signal $s_r(t)$ presents a local extremum that is visible under all conditions. Thus, the origin angular position of the sensors can be timed in a manner that is simple, regardless of the stresses being applied to the tire.

In order to time the remarkable extremum in the reference signal $s_r(t)$, use is made of a tracking signal s' that tracks the reference signal $s_r(t)$ and that has two states, and the remarkable extremum of the reference signal $s_r(t)$ is determined as being the time the tracking signal s' changes from one state to the other.

To reduce the calculation resources needed for tracking the reference signal $s_r(t)$, a discrete tracking signal s' is used with a time pitch p defined as follows:

$s'(p) = (1-\lambda) \cdot s'(p-1) + \lambda \cdot (s(p-1) - s'(p))$ if $s'(p) > s(p)$ then $s'(p) = s(p)$ where $\lambda$ is a value lying in the range 0 to 1 that sets the rate of convergence of the tracking signal s'(p) on the signal s(p). The initial value for s' is selected randomly.

The passage of the signal s(p) through an extremum is detected by a transition in the tracking mode of s'(p). If $s'(p-1) = s(p-1)$ and $s'(p) < s(p)$, then the instant p−1 corresponds to a minimum.

Figure 6A:
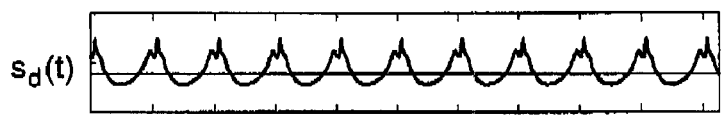
FIGS. 6a, 6b and 6c are graphs showing the right and left signals as a function of time together with the reference signal.
Figure 6B:
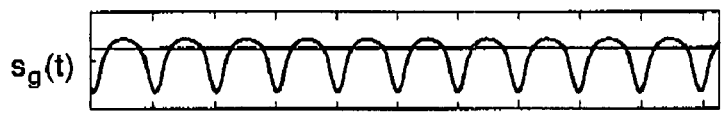

To illustrate this, FIG. 6 shows the signals delivered by the two sensors carried by a tire when the tire is being subjected to strong lateral thrust. As can be seen in FIG. 6a, showing the signal from the right sensor, the local amplitude minima are poorly marked and difficult to detect, whereas the signal delivered by the left sensor and shown in FIG. 6b has local minima that are very well marked.

In FIGS. 6a and 6b, the horizontal line represents the mean of the signals.

Figure 6C:
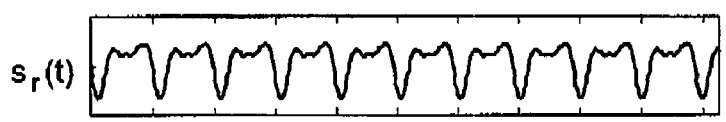

FIG. 6c shows the reference signal $s_r(t)$ obtained by combining the signals delivered by the predetermined function as applied to the right and left signals $s_d(t)$ and $s_g(t)$. In this FIG., it can be seen that the local minima of the reference signal $s_r(t)$ are very well marked, thus making it very easy to time the origin angular position of the tire.

Figure 7:
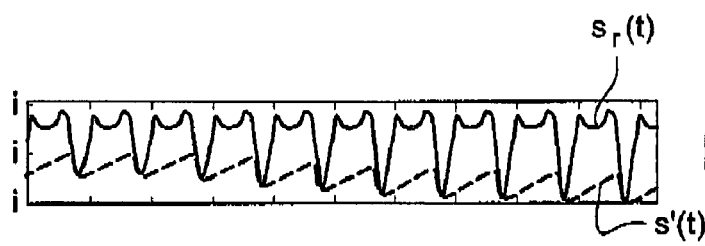
FIG. 7 is a graph showing the reference signal and the tracking signal as a function of time.

FIG. 7 shows the reference signal $s_r(t)$ together with the tracking signal s'(t). The passage of the reference signal through the local minimum is detected by a transition in the tracking mode of the tracking signal.

The speed of convergence of the tracking signal can be modified using the parameter $\lambda$. In most situations, this parameter $\lambda$ is a constant. Nevertheless, when the tire is being subjected to great variations in its speed of rotation, it can be preferable to use a value for $\lambda$ that depends on speed. The person skilled in the art knows how to adapt the value of the parameter $\lambda$ to the situations encountered, in particular to avoid confusing signal noise with the presence of a local amplitude minimum.

The above-described method thus makes it possible in simple manner to time the passage of sensors carried by the tire through an origin angular position $\theta_0$, that is substantially vertically below the axis of the tire. Below, mention is made of the angular position of only one sensor, since the angular position of the other sensor is identical given that they are positioned symmetrically on the tire.

By means of the above-described method, it is also possible to time an arbitrary remarkable angular position $\theta_R$ of the deformation sensor relative to an external frame of reference. This arbitrary remarkable angular position may be characterized in simple manner by its angular offset $(\theta_R - \theta_0)$ from the original angular position $\theta_0$. The instant the sensor passes through the remarkable angular position is written $t_R$. To time this remarkable angular position, various implementations are possible.

In a first implementation, the speed of rotation of the tire is estimated, and the time of the remarkable angular position of the sensor is determined from the time of the origin angular position, from the estimated speed, and from the angular difference between the remarkable angular position and the origin angular position. The speed of rotation of the tire can be estimated from knowledge of the distance of the sensor from the axis of the tire and from knowledge of the value of a period of rotation for the tire, corresponding to the time difference between detecting two remarkable extrema.

To time the remarkable angular position of the sensor, two approaches are possible:
  in a first variant, the instant at which the sensor will be in the remarkable angular position is predicted by knowing both the speed of rotation of the tire as estimated during the preceding revolution and the time at which the sensor passed through the origin angular position. It is then possible to trigger measurement by the sensor on the fly at the predicted instant while the tire is rotating; and
  in a second variant, the reference signal obtained by the method of the invention during one period of rotation of the tire is stored in memory. By knowing the period and the angular position of the signal by virtue of the local extremum, it is possible to determine the instant at which the sensor passed through the remarkable angular position and to extract from the stored signal the data as measured by the sensor at that instant.

This second variant is more robust in that it makes it possible to determine with better accuracy the speed of the tire during the period from which measurements are taken, however it suffers from several drawbacks. Firstly, it requires signals to be stored for a complete revolution so that they can be processed subsequently. Secondly, it delays the time when the measured information becomes available, since it is necessary to wait for the end of one complete revolution of the tire before knowing the measured value.

In a second implementation, the rotary acceleration of the tire is estimated, and the time of the remarkable angular position of the sensor is determined on the basis of the time of the origin angular position, of the estimated acceleration, and of the angular difference between the remarkable angular position and the origin angular position. This method of determining the time of the remarkable angular position is more accurate than the method in the first implementation, but it relies on it being possible to observe the times of three passes of the sensor through the origin angular position in order to be able to estimate the acceleration in rotation of the tire. The calculations are thereafter similar to those described on the assumption of constant speed.

In a third implementation, the time of the remarkable angular position is determined by implementing the following steps:
  starting from the time determined for the sensor passing through the origin angular position, measurement of the angle of rotation of the tire is triggered, e.g. by means of an angle encoder;
  the time of the remarkable angular position is determined as being the time at which a measured angle of rotation of the tire is equal to the angular difference between the remarkable angular position and the origin angular position.

This implementation makes it possible to use angle encoders that are already present on the wheel carrying the tire.

Figure 8A:
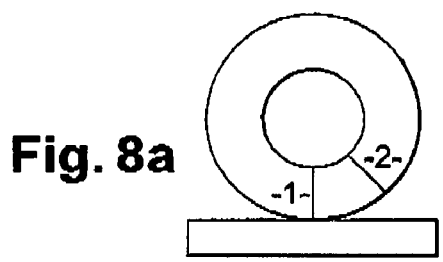
FIGS. 8a and 8b show a tire having two deformation sensors placed at two different angular positions on the tire.
Figure 8B:
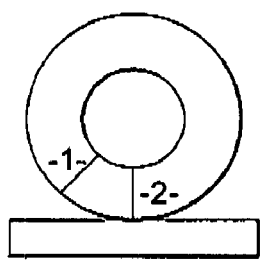

Finally, a fourth implementation for determining the time of the remarkable angular position consists in providing the tire with at least two deformation sensors with a known angular offset between the sensors in a frame of reference associated with the tire. Such a situation is shown in FIG. 8.

When the first sensor is detected as passing through the origin angular position, it is known that the second sensor is in a known remarkable angular position that can be determined by knowing the angular offset between the two sensors. It is then possible to determine the time at which the second sensor is in the remarkable angular position by assuming it is the same as the time at which the first sensor is in the origin angular position. Naturally, the same procedure can be applied when the second sensor passes through the origin angular position.

It should be observed that the four above-described implementations for determining the time of the remarkable angular position can be combined.

The invention is not limited to the above-described implementations. In particular, the invention can apply to any type of sensor carried by a tire, and delivering a signal that presents a remarkable extremum when the sensor passes close to the contact area. By way of example, the invention also applies to sensors for sensing displacement, force, deformation, acceleration, pressure, or to a nail type sensor. The sensor may be located equally well in the side wall, the bottom zone, the tread, a tread knob, or the top of the tire.

The invention claimed is:

1. A method of timing a remarkable angular position ($\theta_R$) of at least one pair of sensors, having a right sensor and a left sensor, carried by a tire rotating relative to an external frame of reference, the pair of sensors being positioned substantially symmetrically about a midplane of the tire and being arranged to measure deformation in a portion of the tire, the deformation being remarkable when passing close to contact area of the tire, wherein the method comprises the steps of:
  forming, from an output signal (s(t)) from the sensors, a reference signal ($s_r(t)$) suitable for presenting a remarkable extremum during one revolution of the tire;
  determining the time ($t_0$) of an origin angular position ($\theta_0$) of the sensors as being the time of the remarkable extremum of the reference signal; and
  determining the time ($t_R$) of the remarkable angular position ($\theta_R$) relative to the time of the origin angular position to obtain a measurement of deformation at the remarkable angular position ($\theta_R$); and
  outputting the measurement for evaluation of tire deformation,
  wherein the reference signal ($s_r(t)$) is formed by applying a predetermined function (f(s)) to each of the output signals ($s_d(t)$, $s_g(t)$) of the sensors, and combining the outputs ($f(s_d(t))$, $f(s_g(t))$) of the predetermined function to obtain the reference signal ($s_r(t)$).

2. The method according to claim 1, in which the output signal of the sensors is characteristic of bending or deradialization of the tire.

3. The method according to claim 2, in which the remarkable extremum of the reference signal ($s_r(t)$) corresponds to a local maximum in the absolute value of the amplitude of the signal when the signal output by the sensors is characteristic of bending of the tire, or to a local maximum in the absolute value of the derivative of the signal when the signal output by the sensors is characteristic of deradialization of the tire.

4. The method according to claim 1, in which the predetermined function (f) applied to a signal s(t) is as follows:

$$\text{if } s(t) > M, \text{ then } f(s(t)) = M;$$

$$\text{if } s(t) < M, \text{ then } f(s(t)) = M + k \cdot (s(t) - M);$$

where M designates the mean of the signal s(t) during a predefined interval, and k is a positive multiplication coefficient.

5. The method according to claim 1, in which in order to time the remarkable extremum of a reference signal ($s_r(t)$), use is made of a tracking signal (s'(t)) tracking the reference signal ($s_r(t)$) and having two states, and the remarkable extremum of the reference signal ($s_r(t)$) is timed at the time the tracking signal (s'(t)) changes from one state to the other.

6. The method according to claim 5, in which the tracking signal s'(t) tracking the reference signal $s_r(t)$ is a discrete signal having a time step p with two states defined as follows:

$$s'(p) = (1-\lambda) \cdot s'(p-1) + \lambda \cdot (s(p-1) - s'(p));$$

$$\text{if } s'(p) > s(p) \text{ then } s'(p) = s(p);$$

where $\lambda$ is a value lying in the range 0 to 1, and the initial value of s' is selected randomly.

7. The method according to claim 1, in which the time ($t_R$) of the remarkable angular position ($\theta_R$) of the sensors is determined from the time ($t_0$) of the origin angular position ($\theta_0$) from an estimated speed of rotation of the tire, and from the angular offset ($\theta_R - \theta_0$) between the remarkable angular position and the origin angular position ($\theta_0$).

8. The method according to claim 7, in which the time ($t_R$) of the next passage of the sensors through the remarkable angular position ($\theta_R$) is predicted from a speed of rotation of the tire as estimated during a preceding revolution of the tire and from the time determined for the passage of the sensors through the origin angular position.

9. The method according to claim 1, in which the time ($t_R$) of the remarkable angular position ($\theta_R$) of the sensors is determined from the time of the origin angular position ($\theta_0$), from an estimated rotary acceleration of the tire, and from the angular offset between the remarkable angular position and the origin angular position.

10. The method according to claim 1, in which at least two pairs of sensors are carried by the tire, the angular offset between the pairs of sensors in a frame of reference associated with the tire being equal to the angular offset ($\theta_R - \theta_0$) between the remarkable angular position ($\theta_R$) and the origin angular position ($\theta_0$), with the time ($t_R$) at which one of the pairs of sensors is in the remarkable angular position ($\theta_R$) being determined by assuming that it is equal to the time at which the other pair of sensors is in the origin angular position ($\theta_0$).

* * * * *